US 6,747,836 B2

(12) United States Patent
Stevens et al.

(10) Patent No.: US 6,747,836 B2
(45) Date of Patent: Jun. 8, 2004

(54) POSITION CONTROL SYSTEM AND METHOD FOR MAGNETIC HARD DISK DRIVE SYSTEMS WITH DUAL STAGE ACTUATION

(75) Inventors: Arthur L. Stevens, Longmont, CO (US); Joseph R. DeLellis, Lafayette, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 342 days.

(21) Appl. No.: 09/904,488

(22) Filed: Jul. 13, 2001

(65) Prior Publication Data

US 2003/0011923 A1 Jan. 16, 2003

(51) Int. Cl.⁷ .............................................. G11B 5/596
(52) U.S. Cl. ............................... 360/78.05; 360/77.08; 360/78.14; 360/77.02
(58) Field of Search .................. 360/77.04, 75, 360/78.04, 78.05, 78.12, 77.02, 77.08, 78.14; 318/560, 590, 592, 593

(56) References Cited

U.S. PATENT DOCUMENTS

| | | | |
|---|---|---|---|
| 5,616,869 A | 4/1997 | Valent | 73/862 |
| 5,654,840 A | 8/1997 | Patton et al. | 360/75 |
| 5,677,609 A | 10/1997 | Khan et al. | 318/561 |
| 5,926,340 A | 7/1999 | Sim | 360/78.09 |
| 5,963,393 A | 10/1999 | Rowan et al. | |
| 6,005,363 A | 12/1999 | Aralis et al. | 318/560 |
| 6,088,187 A * | 7/2000 | Takaishi | 360/78.05 |
| 6,218,800 B1 | 4/2001 | Akkermans et al. | 318/560 |
| 6,219,196 B1 | 4/2001 | Semba et al. | 360/75 |
| 2002/0039248 A1 * | 4/2002 | Liu et al. | 360/77.04 |
| 2002/0101681 A1 * | 8/2002 | He et al. | 360/78.05 |
| 2002/0176201 A1 * | 11/2002 | Hsin et al. | 360/78.05 |
| 2003/0112547 A1 * | 6/2003 | Koso et al. | 360/78.05 |

FOREIGN PATENT DOCUMENTS

| | | |
|---|---|---|
| EP | 0977 181 A2 | 2/2000 |
| EP | 1 276 100 A2 | 1/2003 |
| JP | 02089264 | 3/1990 |

OTHER PUBLICATIONS

Keeping Heads on Track With Dual–Stage Actuators by Fred Stevens and Joe DeLellis, STMicroelectronics; Data Storage, Jun. 2000.

* cited by examiner

*Primary Examiner*—Andrew L. Sniezek
(74) *Attorney, Agent, or Firm*—Lisa K. Jorgenson; William J. Kubida

(57) ABSTRACT

A head position control system for a dual stage actuation disk drive system. A feedback system is provided for modifying a primary and a secondary input command signal to produce primary and secondary error signals. A controller receives the primary error signal and transmits primary actuator arm positioning information to the primary actuator. A secondary controller receives the secondary error signal and transmits secondary actuator arm positioning information to the secondary actuator. The feedback system creates a position error signal (PES) using information from servo wedges and runout information and the PES is used to produce the secondary error signal. The feedback system produces a reconstructed error signal including angular position information for the primary actuator arm by processing a back electromotive force signal from the primary actuator. The primary error signal is produced by modifying the primary input signal with the reconstructed error signal.

25 Claims, 10 Drawing Sheets

# POSITION CONTROL SYSTEM AND METHOD FOR MAGNETIC HARD DISK DRIVE SYSTEMS WITH DUAL STAGE ACTUATION

BACKGROUND OF THE INVENTION

1. Field of the Invention

The present invention relates, in general, to electromechanical servo and other positioning systems and methods for use with magnetic hard disk drives (HDDs), and more particularly, to a position control system and method for disk drive servo positioning in an HDD system that utilizes two mechanically connected but separately positionable actuator assemblies in a dual stage configuration to position a read-write head relative to a magnetic disk.

2. Relevant Background

Millions of HDD systems are produced every year and competition for the revenue from the sale of these HDD systems has resulted in a demand for cost effective and highly accurate read-write operations. To read or write data on a spinning magnetic disk requires accurate dynamic, ongoing positioning of a read-write head in a HDD system relative to a desired track on the magnetic disk. Because measuring the actual position of the head is difficult and expensive to achieve, HDD system manufacturers have dispensed with position sensing. Instead, HDD systems presently use position control systems that position the head using relative track position information obtained or read directly from data contained on the disk itself.

For many conventional HDD systems (such as the HDD system 10 shown in FIG. 1), the absence of this measurement is of minor importance because the actual track position varies in space due to runout. As shown, a conventional HDD system 10 may include an actuator assembly 12 with a pivoting actuator 14 that positions a read/write head 16 by positioning or moving an actuator arm 18 relative to tracks on the magnetic disk 20. Often, the actuator 14 is a current driven voice coil motor (VCM). Runout is the deviation from perfect concentric circles of the positions of the tracks on the magnetic disk 20 and includes deterministic or repeatable runout and random or nonrepeatable runout. Due to the existence of runout, the relative position of the head 16 with respect to a track on the magnetic disk 20 is more important and useful for controlling the position of the head 16 by operating the VCM actuator 14 for reading and writing of data.

The track position data read or obtained via the head 16 is contained in specific areas of the magnetic disk 20 surface called servo wedges 22. There are typically fifty to one hundred equally spaced servo wedges 22 on the surface of each magnetic disk 20. The position data includes track number (and/or cylinder number for multiple disk systems 10) and burst information that quantifies the position offset of the head 16 from a center line of the track currently being read by the head 16.

A conventional position control system 30 is shown in the block diagram of FIG. 2. The position control system 30 utilizes a feedback position control approach to position the head 16 relative to a particular track on the magnetic disk 20. As shown, an input command signal or input variable 32 is provided to a VCM controller 34 which processes the signal 32 and passes a useful control signal 36 to the mechanical system 38 (such as actuator assembly 12). The mechanical system 38 further processes the control signal 36 to address such variables as nonlinear friction 40, torque bias and viscous friction 42 and then acts to position the actuator arm 18 and read/write head 16 along the track center line as commanded by the input set point command 32. The position control system 30 (e.g., the HDD electronic system) processes the track number and center line offset in signal 44 read by the head 16. The effect of runout is modeled by adding a disturbance in the form of a signal 46 to the (unmeasured) absolute position in the feedback section to form a composite position error signal (PES) 48. The PES 48 is fed to the VCM controller 34 as feedback that is used to update and/or correct the position of the read/write head 16. The actual angular position, $y_{pa}$ 50, is not measured by the control system 30.

To provide a competitive edge, HDD systems are being designed and configured with much higher track density to allow storage of more data on similarly-sized magnetic disks. While providing more data storage, these higher track densities have created problems in controlling the position of the read/write heads rapidly with acceptable accuracy. High track density HDD systems place high demands on the control system for resolution and the control system needs to have sufficient bandwidth or capacity to provide useful rejection of disturbances, such as mechanical vibration.

In HDD systems, such as the system 10 shown in FIG. 1, the resonant structural modes of the actuator arm 18 are excited by rapid acceleration during slewing (i.e., a rapid change of position when the system 10 moves at full speed from one track position to another) and rapid decelerations while braking to a stop. Excitation of resonant structural modes causes mechanical vibration resulting in unwanted movement of the head 16 that makes accurate tracking of the position of the head 16 very difficult, especially in the presence of runout. Due to the stiffness and length of the actuator arm 18, conventional VCM-based actuator assemblies 12 such as that shown in FIG. 1 can have very high resonant frequencies, e.g., in the kilohertz range, that require bandwidths in control systems to be large, such as 500 to 800 Hertz. Even with these larger bandwidths, existing control systems are often incapable of quickly and accurately controlling head position. Hence, HDD system designers and manufacturers continue to demand new actuator assemblies to overcome vibration problems. However, changes to the actuator assemblies create new and often unexpected challenges in providing a system and method for controlling the position of the head relative to the magnetic disk.

Hence, there remains a need for an improved method and system for identifying and controlling the positioning of a read/write head relative to tracks on a magnetic disk. Preferably, such a system would enable high performance track following of magnetic track position in the presence of runout and at least in some embodiments, provide high accuracy of positioning of a head without the use of external motion and/or position sensing devices.

SUMMARY OF THE INVENTION

The present invention addresses the above discussed and additional problems by providing a position control system and associated method for providing accurate and efficient control over an actuator assembly in a disk drive system. The actuator assembly includes a primary actuator, such as a VCM actuator, with a large stroke for positioning or pivoting a primary actuator arm to obtain rapid and larger movements to rapidly position a head near a desired track on a disk. The actuator assembly also includes a secondary actuator with a small stroke mounted pivotally on the primary actuator arm for positioning a secondary actuator arm that supports the read/write head over the centerline of a desired track. The position control system includes a primary actuator controller, a secondary controller and a feedback system that in combination are uniquely adapted for independently controlling each of the actuators to overcome prior difficulties with mechanical vibration, saturation and locking of the secondary actuator.

More particularly, a position control system is provided for use in a disk drive system for positioning a head relative to a storage disk in response to an input command signal. The disk drive system includes a primary actuator for positioning a primary actuator arm and a secondary actuator linked to the primary actuator arm for positioning a secondary actuator arm on which the head is mounted. The position control system includes a feedback system or circuit for receiving the input command signal, for splitting the input command signal into a primary and a secondary input command signal and for modifying the primary and secondary input command signals to produce primary and secondary error signals.

A primary actuator controller is linked to the feedback system and the primary actuator. This controller receives the primary error signal and in response, transmits a primary control signal including primary actuator arm positioning information to the primary actuator. Additionally, a secondary actuator controller is linked to the feedback system and the secondary actuator configured to receive the secondary error signal and in response to transmit a secondary control signal including secondary actuator arm positioning information to the secondary actuator. In one embodiment, the feedback system is further adapted for creating a position error signal (PES) using position information obtained from servo wedges in the storage disk modified by sampled runout information. The PES is then used by the feedback system to produce the secondary error signal.

According to an important aspect of the invention, the feedback system includes a spatial position reconstruction mechanism for producing a reconstructed error signal comprising angular position information for the primary actuator arm. The reconstruction mechanism synthesizes the reconstructed error signal by processing an operating parameter, e.g., a back electromotive force signal, of the primary actuator. The primary error signal is then produced by modifying the primary input signal with the reconstructed error signal. In one embodiment, the feedback system further includes a settle detection element for determining when the primary error signal has a magnitude less than a threshold value and when "settling" has occurred, an output signal is transmitted to a switch in the secondary actuator controller to begin positioning of the secondary actuator arm.

DETAILED DESCRIPTION OF THE PREFERRED EMBODIMENTS

Figure 1:
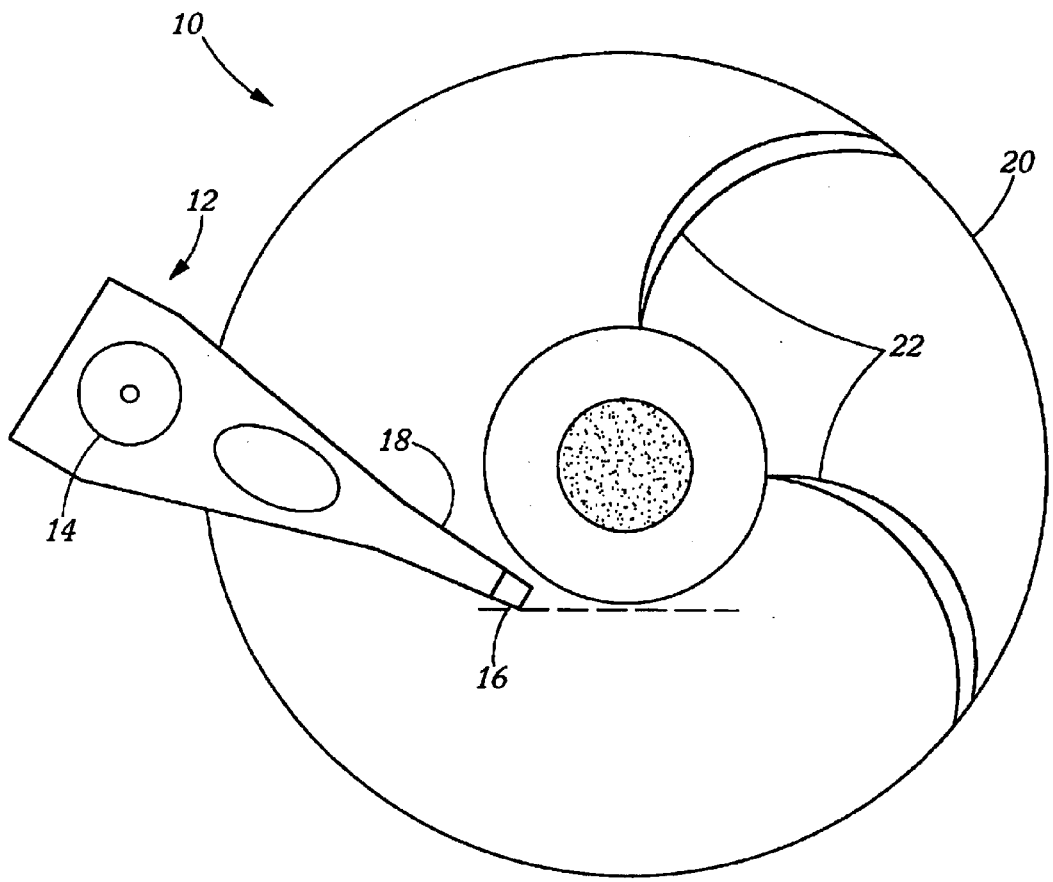
FIG. 1 illustrates a conventional magnetic hard disk drive (HDD) system with an actuator assembly positioning a read/write head relative to a magnetic disk.
Figure 2:
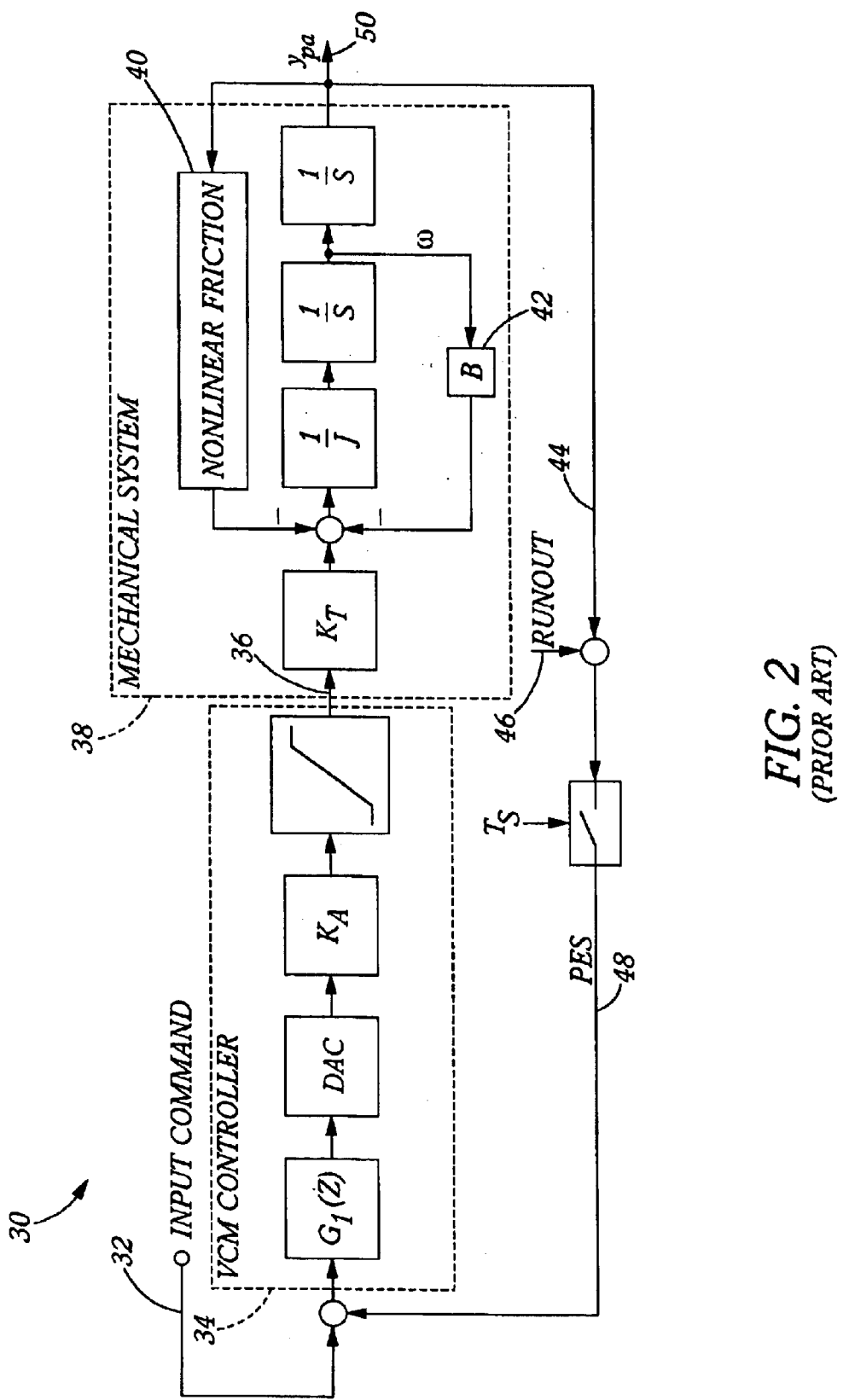
FIG. 2 is a block diagram of a typical position control system used with the HDD system of FIG. 1.
Figure 3:
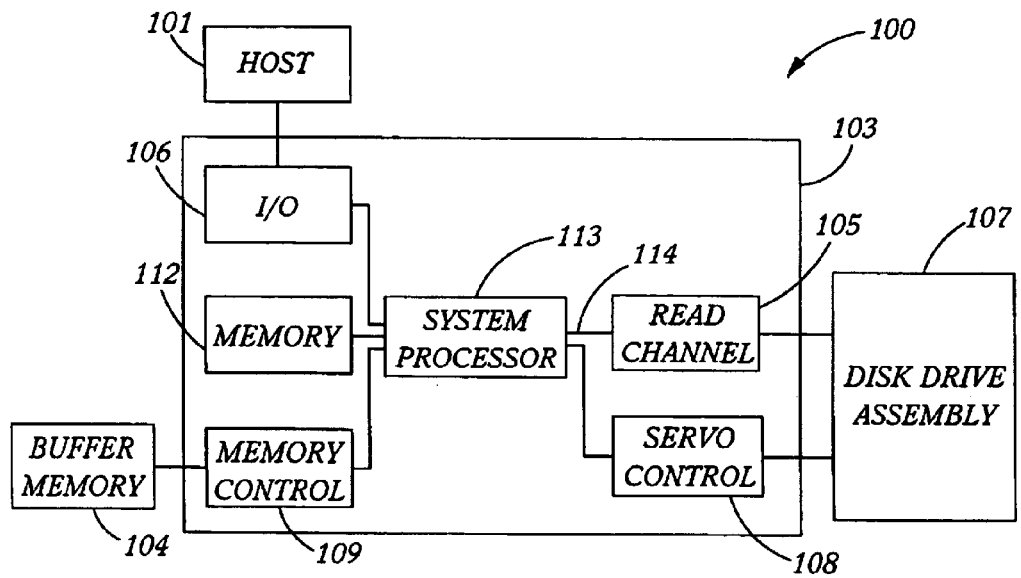
FIG. 3 is a disk drive system that utilizes a position control system according to the present invention.

FIG. 3 illustrates in simplified form a drive system 100 in which the present invention is embodied. Disk drive system 100 includes a system processor 113 that processes requests and commands from a host computer 101 that direct the drive system to perform specific behavior involving disk drive assembly 107. Examples include reading and writing data to disk drive assembly 107, providing state information such as defect tables, error status and the like. Disk controller unit 103 includes data processing capacity as well as memory in the form of ROM or RAM 112 and buffer memory 104 to generate responses to received commands and requests. The generated responses return data, state information and/or error codes depending on the particular operation being performed.

Disk drive assembly 107, e.g., an HDD system, implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks and voice coil motor (VCM) for positioning the read/write head electronics at specific locations with respect to the disk surface(s).

Servo control 108 generates drive signals that control the VCM and/or spin motors. These drive signals are in the form of precision voltage or current signals that drive the motors directly. In accordance with the present invention, servo control 108 includes a driver and supplies the drive signals using a power drive circuit such as an H-bridge transistor configuration. The operation of the invention does not in any way depend on how the VCM is driven. The VCM is usually driven by a transconductance amplifier with a gain $K_A$, but could also be voltage driven or with many other suitable methods. As it has no bearing on the validity on the operation of the proposed system, the type of drive may be varied in practicing the invention and the drivers described do not limit the invention.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host 101 to the disk controller 103 includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection and the like) to memory controller 109.

Figure 4:
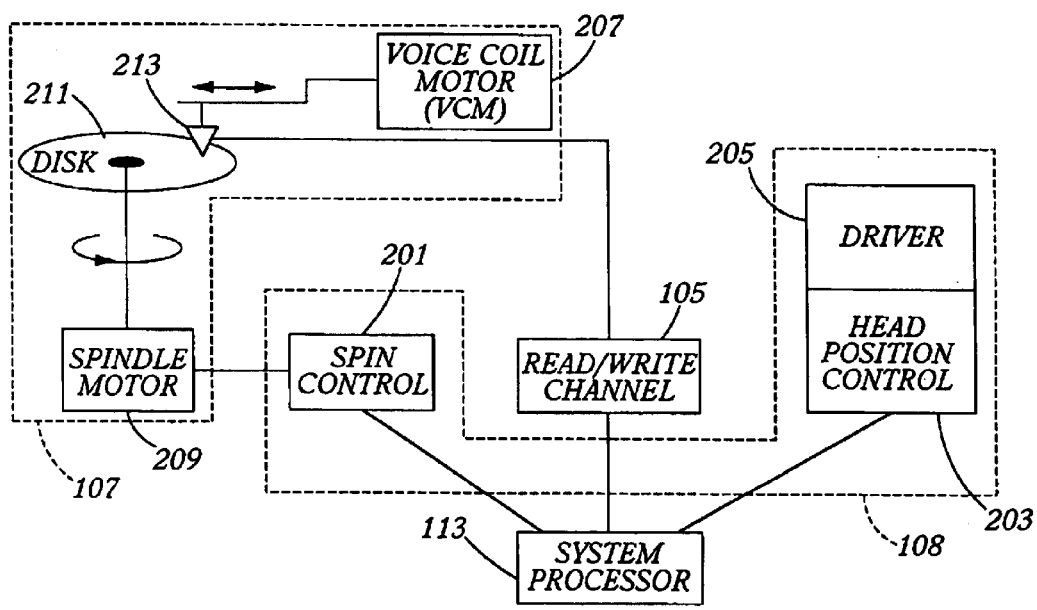
FIG. 4 illustrates more details of portions of the disk drive system of FIG. 3 including a position control system operating to position a read/write head relative to a magnetic disk.

FIG. 4 illustrates some of the components of FIG. 3 in greater detail. As shown in FIG. 4, servo control 108 includes spin control unit 201 that regulates the spin speed of spindle motor 209 in response to commands from system processor 113. Head position control unit 203 operates through driver 205 to deliver input command signals in response to commands from system processor 113 to position control system 207 of the invention. These input command signals cause the position control system 207 to move or position read/write head 213 in precision alignment with respect to the surfaces of disk 211. According to a significant feature of the invention, the position control system 207 is adapted to control operation of a dual stage actuator assembly (shown in FIG. 5) to control operation of two actuators to position the head 213 in a manner that quickly reacts to disturbances (such as mechanical vibration).

Read channel circuit 105 communicates data and control information with the surface of disk 211. Control information such as servo control data, phase lock oscillator synchronization patterns and servo bursts are encoded into portions of disk 211. This information is provided through read channel circuit 105 to system processor 113. System processor 113 uses this information to compute commands for spin control unit 201 and head position control unit 203. Dependent on the admittance function of the load, the computed commands will not result in ideal reactions, hence, the computed commands are modified by head position control unit 203 and/or driver 205 so as to compensate for variations in the current/voltage relationship caused load impedance.

With a general understanding of the operation of a disk drive system 100 and the need for accurate positioning of the read/write head 213 with a position control system 207, the following discussion will provide a discussion of a dual stage actuation system useful for overcoming mechanical vibration problems in single actuator systems and a number of position control systems useful for accurately controlling such a dual stage actuation system.

Figure 5:
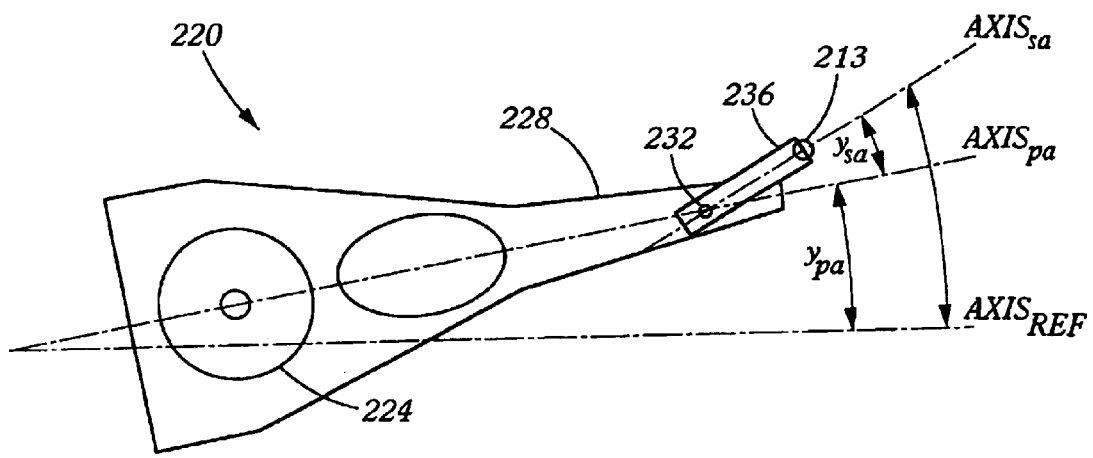
FIG. 5 is a simplified illustration of an actuator assembly controlled and positioned by the position control system of the present invention and including two actuators.

FIG. 5 is a simplified illustration of a dual stage actuator assembly 220 that is useful for describing the operation of the assembly 220 and the positioning of the read/write head 213. As shown, the actuator assembly 220 includes a primary actuator 224, such as a VCM, for rotating a primary actuator arm 228 about the actuator pivot 224. The angular position, $y_{pa}$, of the primary actuator arm 228 can be described as the angular offset of an axis of the arm 228 from a reference axis, $axis_{ref}$.

The actuator assembly 220 further includes a secondary actuator 232 pivotally attached toward the end of the primary actuator arm 228 or, in the case of a micro-electromechanical system (MEMS) or similar type device, co-located with the actual head. The secondary actuator 232 is useful for pivoting the secondary actuator arm 236 to make minor adjustments to accurately locate the read/write head 213. The angular position, $y_{sa}$, of the secondary actuator arm 236 is measured from an $axis_{sa}$ of the secondary actuator arm 236 relative to the $axis_{pa}$ of the primary actuator arm 228. The angular position, $y_h$, of the read/write head 213 is then the combination of these two angular positions.

During operation, the dual stage actuator assembly 220 uses the primary VCM actuator 224 and actuator arm 228 in combination with the smaller, higher precision actuator 232 and secondary actuator arm 236. The primary actuator pivot 224 and arm 228 has a low bandwidth but a large range that is suitable for fast slewing. The secondary actuator 232 and arm 236 has a high bandwidth and resolution but has limited range that makes it suitable for accurate tracking of small, rapid position deviations. The purpose of the primary actuator 224 and arm 228 can be thought of as a vehicle for rapidly transporting the secondary actuator 232 and arm 236 with the read/write head 213 to a position as close to the center line of a desired track position (e.g., a track position identified by an input command signal) as the accuracy and resolution of the primary actuator 224 allows. Once the secondary actuator 232 and arm 236 are positioned such that the deviation from the desired track position is within its total stroke (e.g., the maximum possible deviation in both angular directions from the $axis_{sa}$ of the secondary actuator arm 236) then track following is performed by controlling the secondary actuator 232 within its constraints of bandwidth and slew rate.

Figure 6:
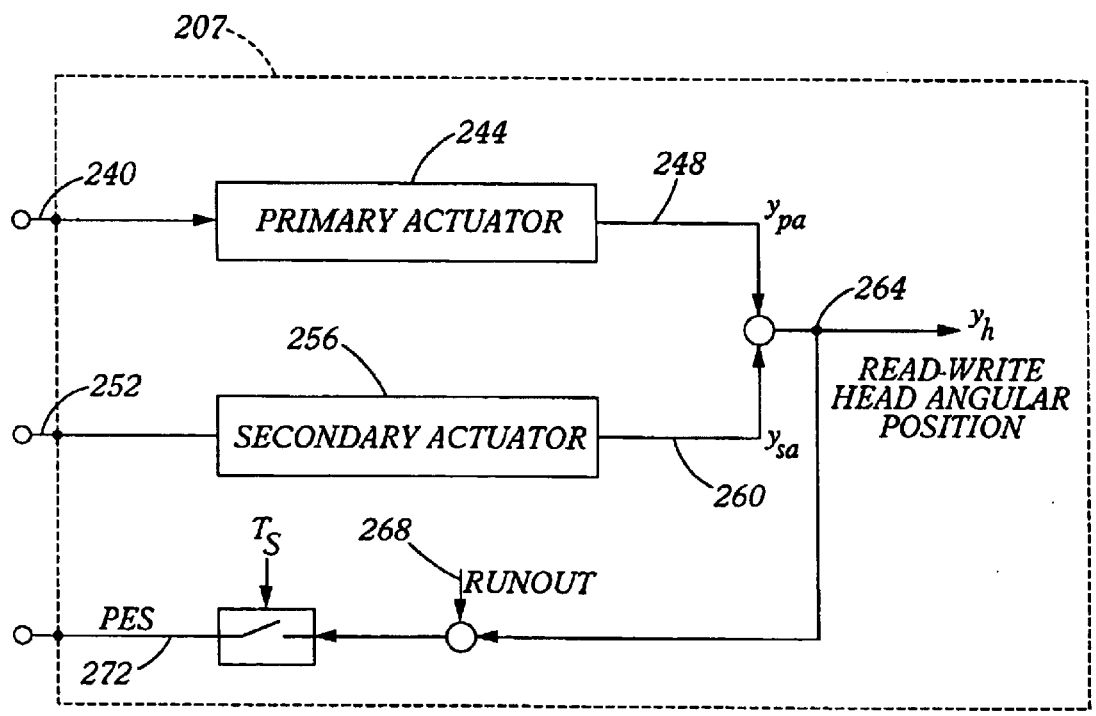
FIG. 6 is a block diagram of one embodiment of the position control system of FIG. 5.

A number of control techniques and systems can be used to control the actuator assembly 220. FIG. 6 illustrates a control system 207 that may be incorporated in the disk drive system 100 as shown in FIG. 4. As shown, the control system 207 includes a primary actuator and controller 244 to position, $y_{pa}$ 312 the primary actuator arm 228 in response to an input command signal 240 and a secondary actuator and controller 256 to position $y_{sa}$ 260 the secondary actuator arm 236 in response to an input command signal 252. In this manner, the angular position, $y_h$, of the head 213 is controlled.

However, the angular positions, $y_h$, $y_{pa}$, and $y_{sa}$, are not measured. Instead, a sampler utilizes the output signal 264 and the position information obtained from the servo wedges 22 along with the unknown runout signal 268 to sample or create a PES 272. The input command signals 240, 252 are both derived from the PES 272 and cause the VCM actuator 224 and the secondary actuator 232 to begin moving in the same direction. In other words, the control system 207 operates primarily to provide control based on the PES 272.

Figure 7:
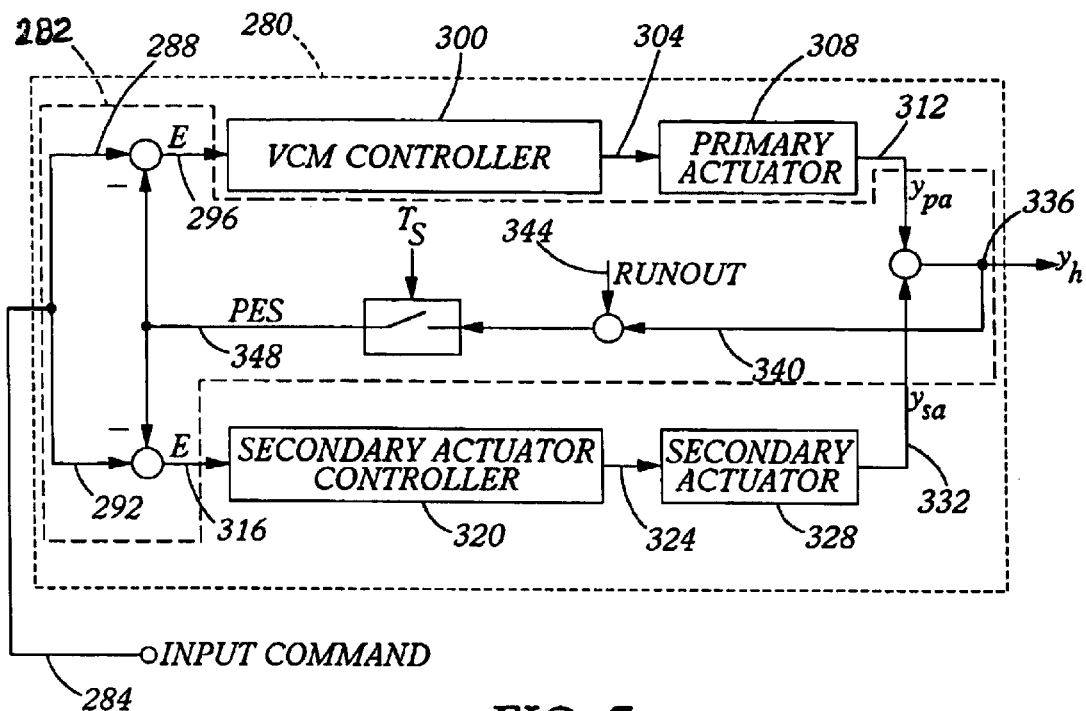
FIG. 7 is a block diagram of a position control system of FIG. 5 using only the PES to provide control of the actuator assembly.

FIG. 7 provides a more detailed description of a control system 280 with a feedback system 282 that may be provided to control the position of the read/write head 213. As illustrated, an input command signal 284 is provided to the system 280 and split into two input commands 288 and 292. The first input command 288 is modified by the PES 348 to create an error signal, e, 296 that is passed to the VCM controller 300. The VCM controller 300 produces a position control signal 304 that is transmitted to the primary actuator 308 (such as a VCM actuator 224 shown in FIG. 5) to position the primary actuator arm 228 at an angular position, $y_{pa}$, 312.

Similarly, the second input command 292 is modified by the PES to create an error signal, e, 316 that is passed to the secondary actuator controller 320. In other words, both actuators 300 and 320 have the same error signal, e, 296 and 316 as inputs. The secondary actuator controller 320 outputs a control signal 324 to operate the secondary actuator 328 (such as the actuator 232 of FIG. 5) to position $y_{sa}$ 332 the secondary arm 236. The combined positions $y_{pa}$ and $y_{sa}$ provide the position $y_h$ 336 of the read/write head 213. A sampler takes as input the signal 340, the servo wedge position data and the unknown runout signal 344 to create the PES 348, which, as shown, is used to modify the input command signals 288 and 292.

While these control systems 207, 280 provide an improved level of positioning control over a single actuator system, there remains room for improving head position control for dual actuator assemblies 220. Referring to FIG. 5, because the response speed of the secondary actuator 232 is so much faster than that of the primary actuator 224, the secondary actuator 232 may go into saturation.

Figure 10A:
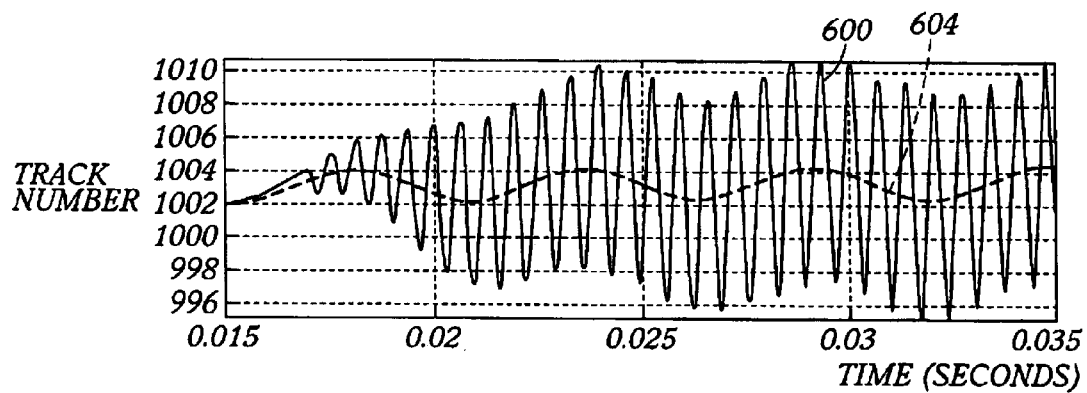
FIGS. 10A and 10B illustrate read/write head position relative to runout (i.e., 180 Hz) and secondary actuator arm position relative to runout for position control system that does not use reconstructed primary actuator arm position measurements.
Figure 10B:
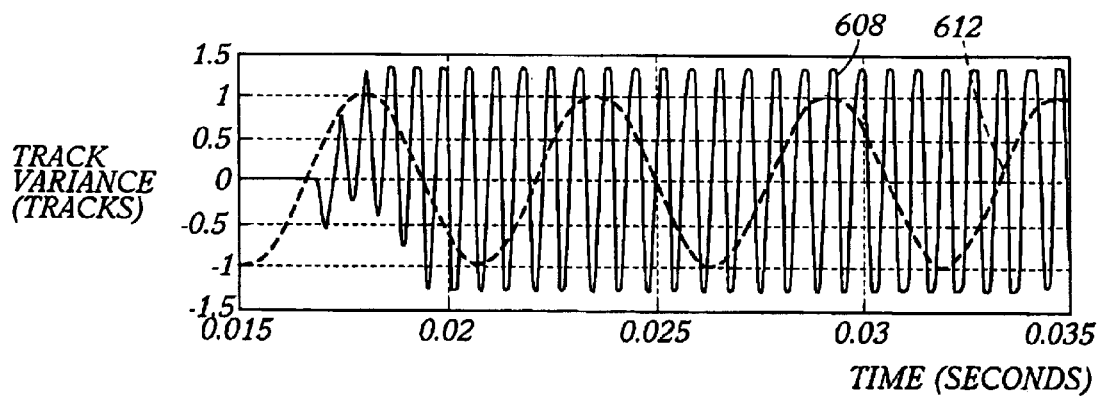

As shown in FIGS. 10A and 10B, saturation of the secondary actuator 232 can cause the secondary actuator arm 236 to hit the upper and lower mechanical stops at the ends of its stroke in an oscillatory fashion. FIGS. 10A and 10B illustrates a modeling of operation of the actuator assembly 220 with the control systems 207 and 280. In the figures, the runout is shown by dashed lines 604 and 612 and has a value of about 180 Hz (merely an example). For a HDD with a rotational velocity of 5,400 RPM, the "once-around" runout frequency (1F) is 90 Hz, the 2F is 180 Hz and so on. A track, such as track 1003, is provided in the input command as a desired track. The control systems 207, 280 attempt to provide position control but oscillation or vibration occurs which cannot be fully overcome due to saturation. FIG. 10A illustrates with solid line 600 the position of the read/write head 213 and FIG. 10B illustrates with a solid line 608 the track variance of the angular position $y_{sa}$ of the secondary actuator arm 236.

Figure 12A:
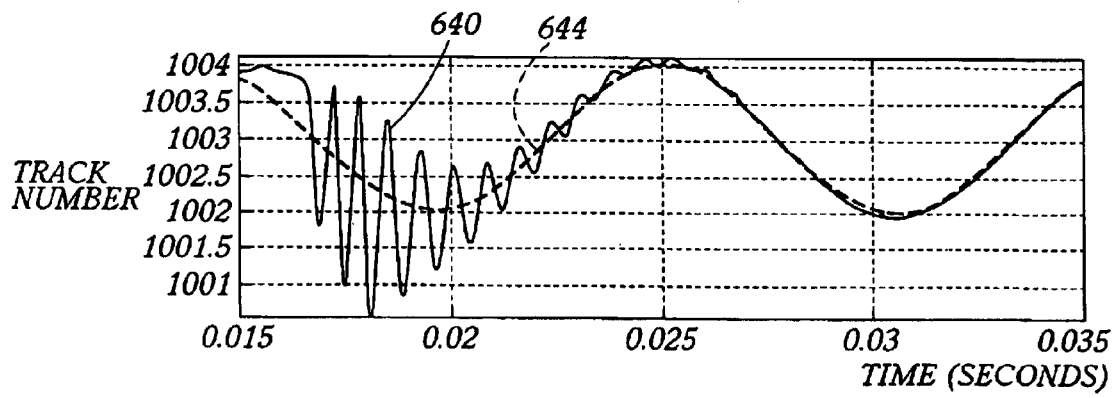
FIGS. 12A and 12B illustrate read/write head position relative to runout (i.e., 90 Hz) and secondary actuator arm position relative to runout for position control system that does not use reconstructed primary actuator arm position measurements.
Figure 12B:
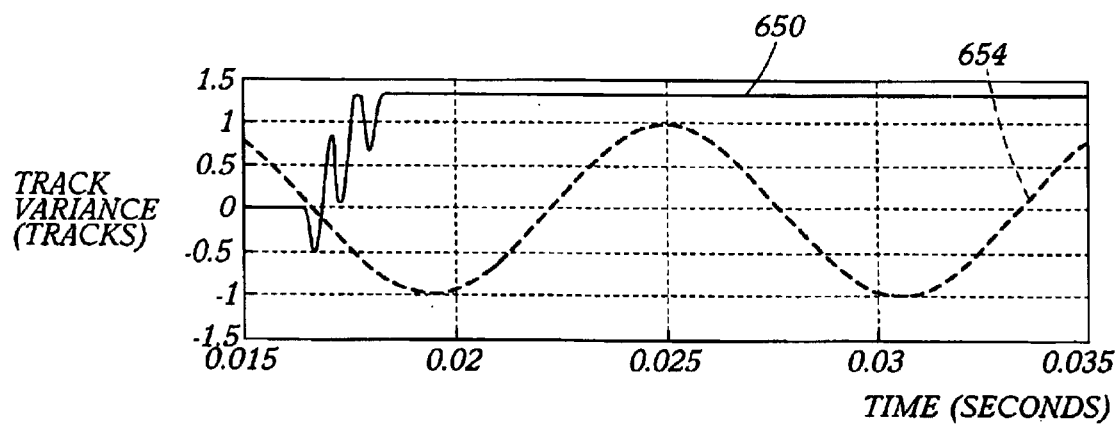

Saturation of the secondary actuator 232 may also result in the secondary actuator arm 236 becoming locked to one of its mechanical stops during track following. This is illustrated in FIGS. 12A and 12B, which show dual stage tracking performance for the actuator assembly 220 with runout of about 90 Hz as controlled by position control systems 207, 280. Again, FIG. 12A illustrates the position, $y_h$, of the read/write head 213 with solid line 640 relative to the runout shown with dashed line 644. FIG. 12B illustrates the position, $y_{sa}$, of the secondary actuator arm 236 as it initially oscillates and then becomes locked at one end stop with track variance of over one track. Hence, while providing useful control of the dual stage actuator assembly 220, improvements over the control systems 207, 280 are desirable to make best use of the potential operational benefits of dual stage actuator systems, such as actuator assembly 220.

To control saturation and locking of the secondary actuator 232 and arm 236 during track following, a control system may be preferred that provides for independent control over the primary and secondary actuators 224 and 236. To allow independent control, a "measurement" of the relative positions, such as angular positions, of the two actuator arms 228, 236 is obtained to allow two separate and distinct actuation or input command signals to be created.

Figure 8:
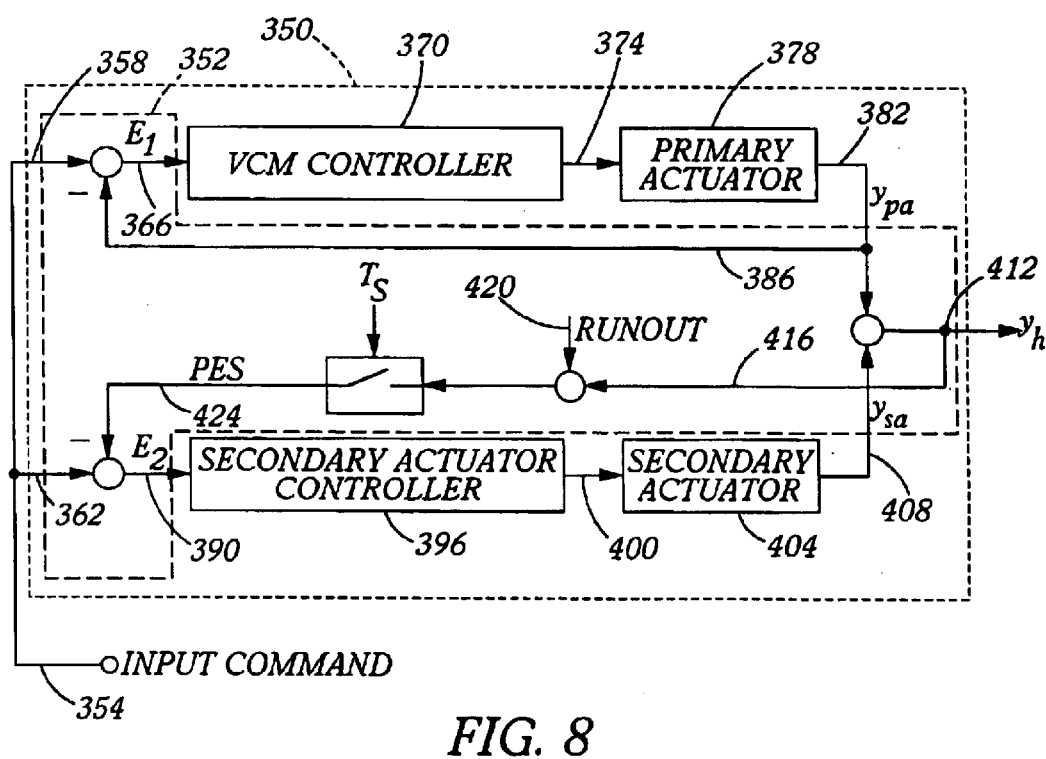
FIG. 8 is a block diagram similar to that of FIG. 7 illustrating a position control system of FIG. 5 using primary actuator arm position and the PES to control the secondary actuator assembly.

In one embodiment, a control system 350 as shown in FIG. 8 is provided that utilizes the actual angular position, $y_{pa}$, of the primary actuator arm 228. With this actual measurement, the control system 350 is able to control the movement of the VCM actuator 224 in space and at the same time, control the secondary actuator 232 so it does not go into saturation. In this manner, independent control over each of the actuators 224 and 232 is achieved by the control system 350.

As shown in FIG. 8, the control system 350 includes a feedback system 352 that receives an input command signal 354 which it feeds as separate input command signals 358 and 362 to a primary actuator control portion and a secondary actuator control portion. The input command signal 358 is modified by a signal, $y_{pa}$ 386 representing the actual pivot angular position in space of the primary actuator arm 228. The position, $y_{pa}$ 382 is measured directly and fed back to modify (e.g., subtracted from) the input command signal 358 to create the primary actuator spatial error signal $e_1$. The error signal $e_1$ is fed to the VCM controller 370 which synthesizes a control signal 374 to send to the primary actuator 378 to position the primary actuator arm 228.

The input command signal 362 is modified by the PES 424 to create a relative error signal $e_2$ 390 which is fed only to the secondary actuator controller 396 (rather that to both controllers as in systems 307, 380). The secondary actuator controller 396 creates a control signal 400 for use by the secondary actuator 404 in positioning $y_{sa}$ the secondary actuator arm 236 which results in the positioning of the head 213 at $y_h$. The PES 424 is obtained by sampling and combining the wedge servo data 416 and the runout signal 420. Effective position control of the head 213 is achieved by the independent control of the primary and secondary actuators of the assembly 220 with the use of both the spatial and relative position errors, $e_1$ and $e_2$.

Figure 9:
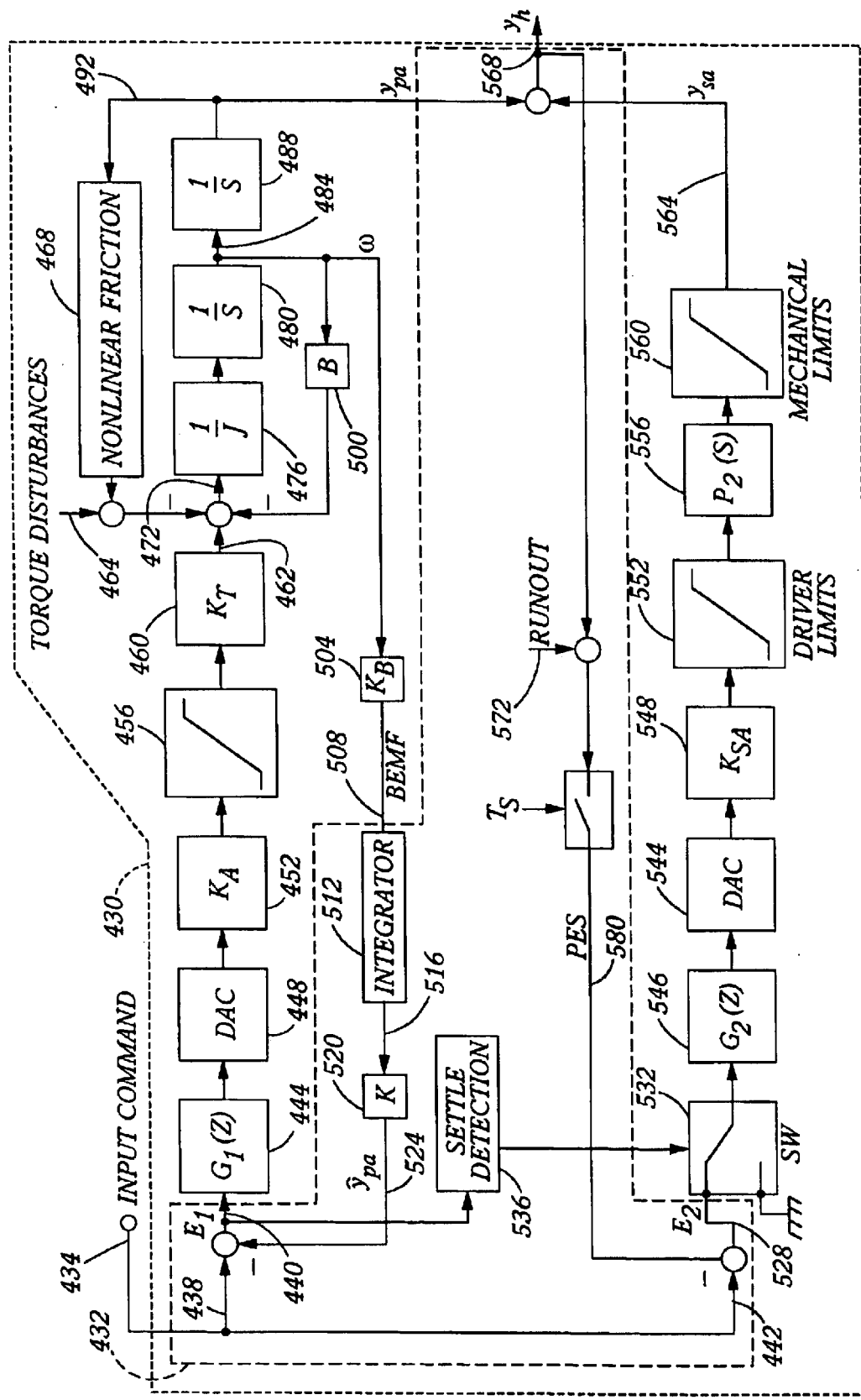
FIG. 9 is a block diagram illustrating a position control system of FIG. 5 which utilizes a dual stage control strategy to control positioning of the actuator assembly using reconstructed primary actuator arm position measurements and the PES.

The present invention recognizes that in many disk drive systems 100 it would be more beneficial for cost reasons and for spacing and other design reasons to control position of the head 213 in a dual stage actuator assembly 220 without the use of position measuring sensors and associated circuitry. Hence, when no explicit absolute spatial motion or position sensing capability for either of the two actuator arms 228, 236 is available, the invention provides for a control system and method that reconstructs useful position parameters from other disk drive system parameters. One embodiment of such a control system 430 with a feedback system 432 that provides unique and additional elements or stages to the control system 350 is shown in FIG. 9. The position control system 430 improves over the control systems 207, 280 by synthesizing input command signals for controlling each actuator 224, 232 that account for the differing dynamic behaviors of each element.

According to an important aspect of the invention, the position control system 430 utilizes the back electromotive force (EMF) signal developed by the primary VCM actuator 224 (of FIG. 5) to reconstruct the spatial position of the primary actuator arm 228. The inventors recognize that reconstructing additional spatial velocity or position measurements from the PES using a state estimation scheme is most likely impractical because the PES is a relative position error signal (i.e., a combination of the actual head position in space and the runout signal as shown in FIG. 8) and the runout signal is difficult to measure and then dissociate from the PES to yield the desired spatial measurement.

By using the EMF signal from the primary VCM actuator 224, this difficulty or limitation is effectively overcome. Position reconstruction from an available signal from the VCM actuator 224 enables independent control of the two mechanical actuators 224, 232 without measuring actual positions with sensing equipment. While the control system 430 provides one useful implementation of a control system with a spatial position reconstruction filter, numerous other reconstruction filters may be implemented to practice the invention such as analogue, digital, software and combinations of these techniques and components.

As shown, the position control system 430 receives an input command signal 434 which is transmitted to two branch circuits (e.g., a primary actuator control portion and a secondary actuator control portion) as signals 438 and 442. The signal 438 sent to the primary actuator control portion is modified by the reconstructed error signal, $\hat{y}_{pa}$, 524 (which is discussed in detail below) and the signal 442 sent to the secondary actuator control portion is modified by the PES 580.

The primary actuator control portion comprises three general circuits or mechanisms including a primary actuator controller, a mechanical system (e.g., the primary VCM actuator 224), and a spatial position reconstruction mechanism (which can be thought of as part of the feedback system of the control system 430). The primary actuator controller, as shown, receives the error signal $e_1$ 440 at a primary controller 444 which processes the signal and passes the signal through a digital to analog converter 448, a power amplifier 452 and a saturation block 456 to model the limited output range of the amplifier 452. The power amplifier may contain various internal feedbacks or other circuitry and its exact operation is not significant to the invention as long as it drives the VCM linearly over its required operating range. The processed signal is then passed to the mechanical system where it is received at a multiplier element 460 which models the VCM torque constant.

The signal 462 is then modified by feedback signals to account for torque disturbances 464, nonlinear friction 468 and viscous friction at 500. The modified signal 472 is further processed for use by the primary actuator 224 by elements 476, 480 (after which the signal is passed to feedback element 500 and spatial position reconstruction circuit elements) and element 488 to produce the position $y_{pa}$ 492 of the primary actuator arm 228 (as shown in FIG. 5).

The spatial position reconstruction circuit includes a multiplier element 520 to receive the integrated EMF signal obtained from the VCM primary actuator 224 and to include gain (such as to account for offsets and for fine tuning the control loop performance torque bias) to create the back EMF signal 508. Note, the block 460 with gain $K_T$ and block 504 with gain KB are parameters of the VCM, i.e., the torque constant (typically stated in units of Newton-meters per ampere) and the back EMF constant (typically stated in units of Volts per radians per second) which can have the same numeric value. The block 500 with gain B is the viscous damping constant (typically stated in units of Newton-meters per radian per second) that depends on the VCM bearing viscous friction parameters.

The back EMF signal 508 is passed through an integrator 512 to create signal 516 which is passed through element 520 to provide additional gain and to fine tune the control loop performance. In this manner, the reconstructed error signal $\hat{y}_{pa}$ 524 is created from back EMF signal 508 of the primary actuator 224 for use in creating the primary error signal $e_1$ 440. Unlike the motor parameters mentioned above that are physical constants due to motor physics, the block or element 520 with gain K is a scaling factor or gain introduced into the control loop in order to provide the correctly scaled units as well as to provide a fine tuning constant to fine tune the performance of the control loop. The integrator 512 does not need to be a circuit and can be an algorithm embedded in firmware of the control loop program. The limiters (i.e., blocks 456, 552, 560) may not be separate physical entities but are shown in this fashion to model the physical limits in range of the various devices.

The secondary actuator control portion of the control system 430 is similar to the control system 350 of FIG. 8 and is configured to receive error signal $e_2$ 528 at a switch 532 which is controlled, in part, by a signal from settle detection element 536. A secondary actuator control portion or circuit is provided that includes a secondary actuator controller 546, a digital to analog converter 544, a multiplier 548 to include gain and a limiter 552. The signal from the secondary actuator control portion is passed to the mechanical system or circuit that includes elements 556 and mechanical limiter 560 for operating the secondary actuator 232 to position $y_{sa}$ 564 the secondary actuator arm 236. The combined positions of the two actuator arms 228 and 236 provide the position $y_h$ 568 of the read/write head 213.

The secondary actuator control portion further includes a feedback circuit (e.g., a portion of the feedback system of the control system 430) for receiving data from the servo wedge 22 read by the head 213 and modifying this data by the runout 572 to create the PES 580, which is then used to create the error signal $e_2$ 528.

Operation of the position control system 430 will now be further discussed in the environment of a seek process to facilitate fuller understanding of the unique effectiveness of the invention. During a seek maneuver initiated by an input command signal 434, initially the switch 532 holds the input to the secondary actuator controller 546 at zero so that the position of the secondary actuator arm 236 is substantially centered in the middle of its stroke and co-linear with the center line (i.e., axis$_{pa}$) of the primary actuator arm 228. The error input signal $e_1$ 440 to the primary actuator controller 444 is initially large so the controller 444 passes a signal 462 to the mechanical system components 476, 480, and the like to rapidly operate the VCM primary actuator 224 to move the arm 228 in a direction that reduces the magnitude of the error signal $e_1$ 440.

The settle detection element 536 detects when settling has occurred by determining when the magnitude of the error signal $e_1$ 440 has dropped below a specified threshold dictated by the positional range or stroke of the secondary actuator 232 and arm 236 for a specified time. The output of the settle detection element 536 then changes the polarity of the switch 532 such that the error signal $e_2$ 528 is allowed to be passed to the secondary actuator controller 546 to enable positioning or movement of the secondary actuator 232 to reposition or fine tune the position of the head 213.

Once settling has been detected, the spatial position of the read/write head 213 is as close to the expected center line of the desired track in the input command signal 434 as the resolution of the primary actuator control portion or loop can achieve. At this point, the primary actuator control loop has minimized or lowered the magnitude of the error or deviation between the desired track center line position as defined by the input command signal 434 and the reconstructed spatial position $\hat{y}_{pa}$ of the primary actuator arm 228. Because the error signal $e_1$ corresponds to actual spatial coordinates, the primary actuator controller 444 operates to hold the primary actuator arm 228 (which is mechanically connected to and supports the secondary actuator 232, i.e., secondary actuator arm 236 pivot point) in a stationary position above the expected position of the center line of the desired track.

Once a relatively stationary pivot reference point for the secondary actuator arm 236 has been established, the "relative" position error signal $e_2$ 528 is processed by the secondary actuator controller 546 to perform highly accurate track following (i.e., enhanced tracking over tracking performed by a single actuator arm system). In other words, the secondary actuator 232 is operated by the position control system 430 to hold the secondary actuator arm 236 and head 213 substantially co-linear with the primary actuator arm 228 (i.e., hold $axis_{pa}$ and $axis_{sa}$ substantially parallel) until settling is detected including correction based on the reconstructed error signal $\hat{y}_{pa}$ 524. Once settling is more accurately achieved, the position control system 430 operates to move the secondary actuator arm 236 and head 213 based on PES 580 to accurately track the desired or input track in the input command signal 434.

As discussed above, the reconstructed error signal $\hat{y}_{pa}$ 524 is obtained by passing the back EMF signal 508 obtained from the VCM primary actuator 224 (i.e., the mechanical system components in FIG. 9) through the integrator 512 and gain element 520. The back EMF signal 508 is directly proportional to the spatial angular velocity of the primary actuator 224 and primary actuator arm 228 position. Integration of this signal with integrator 512 and scaling by an appropriately selected gain, K, produces the reconstructed error signal $\hat{y}_{pa}$ 524 of the actual position in space $y_{pa}$ of the primary actuator arm 228 and, hence, the location of the secondary actuator 232 and pivot point for the secondary actuator arm 236.

Figure 11A:
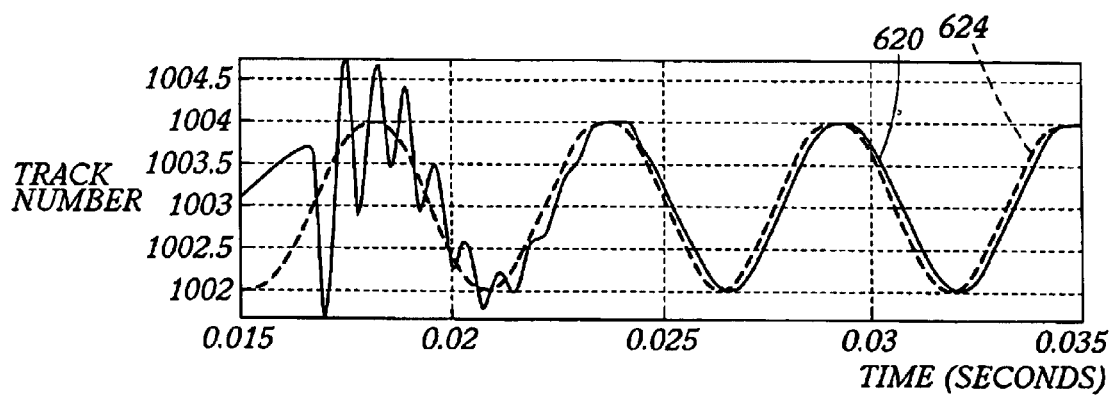
FIGS. 11A and 11B are graphs similar to FIGS. 10A and 10B illustrating the significantly enhanced control provided by a position control system utilizing reconstructed primary actuator arm position measurements.
Figure 11B:
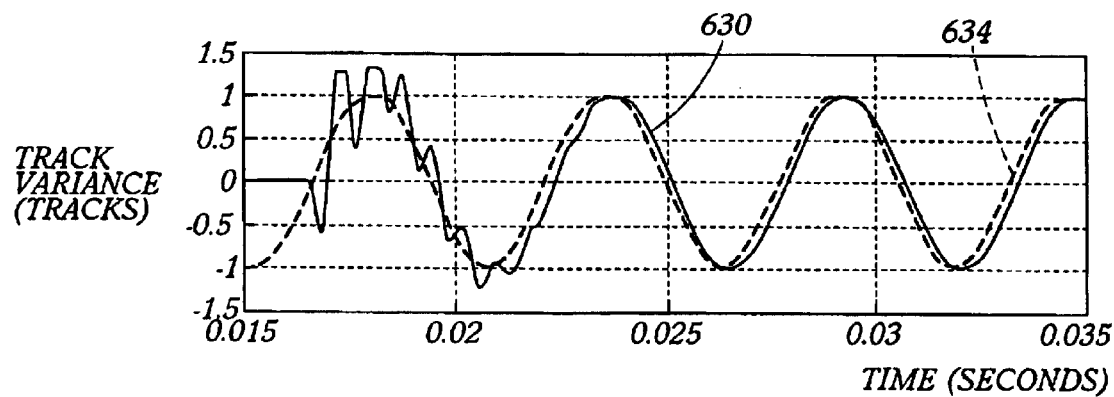

The significant improvement in head position control is clearly shown in FIGS. 11A and 11B, with dashed lines 624 and 634 indicating runout and solid lines 620 and 630 indicating read/write head 213 position and secondary actuator arm position $y_{sa}$, respectively. These figures show tracking performance of the actuator assembly 220 with the control system 430 in the environment of 180 Hz runout (as was the case for the control system performance shown in FIGS. 10A and 10B without reconstructed error signal feedback). As shown in FIG. 11A, steady state tracking is rapidly achieved with the position control system 430. Further, this rapid steady state tracking is achieved without saturation of the secondary actuator 232. Note, the actual value of the runout frequency components will vary with faster or slower spin speeds and the above environment is not limiting to the invention.

Figure 13A:
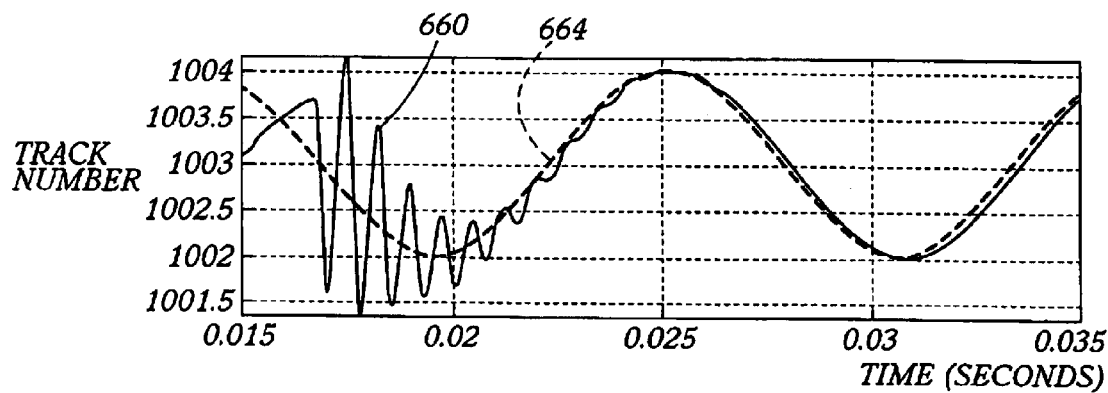
FIGS. 13A and 13B are graphs similar to FIGS. 12A and 13B illustrating the significantly enhanced control provided by a position control system utilizing reconstructed primary actuator arm position measurements.
Figure 13B:
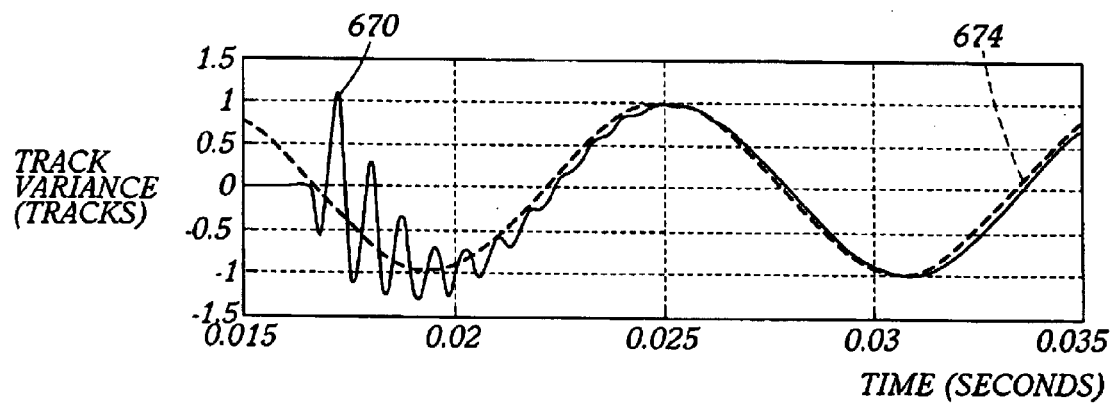

Tracking performance is also excellent in the less demanding environment of 90 Hz runout. FIGS. 13A and 13B illustrate this improved performance over the control system performance shown in FIGS. 12A and 12B that did not utilize a reconstructed error signal. In these figures, the dashed lines 664 and 654 show system runout and the solid lines indicate read/write head 213 position and secondary actuator arm position $y_{sa}$. As can be seen from these figures, steady state tracking is accurately achieved without saturation and locking of the secondary actuator 232 and in a timely manner, i.e., less than 0.025 seconds. Better performance is expected with fine tuning of the described design without departing from the techniques of the present invention.

Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention, as hereinafter claimed. For example, the actual implementation of the reconstruction filter or circuit in FIG. 9 can be accomplished with a number of processing techniques, circuitry and components such as, but not limited to, analogue and digital components and software and combinations of these types of components. Additionally, the control systems shown are useful with other two-actuator assemblies (not shown) in which it is useful to first position a primary actuator and then position a secondary actuator to fine tune the position of the read/write head. The control system is not limited to use with the actuator assembly shown in FIG. 5. For example, when new devices such as MEMS types or any other activator without position feedback become available, the present invention is readily adapted to provide control functions.

We claim:

1. A position control system for use in a disk drive system for positioning a head relative to a storage disk in response to an input command signal, the disk drive system including a primary actuator for positioning a primary actuator arm and a secondary actuator linked to the primary actuator arm for positioning a secondary actuator arm on which the head is mounted, the position control system comprising:

a feedback system adapted for receiving the input command signal, for splitting the input command signal into a primary and a secondary input command signal and for modifying the primary and secondary input command signals to produce primary and secondary error signals;

a primary actuator controller linked to the feedback system and the primary actuator and configured to receive the primary error signal and in response to transmit a primary control signal including primary actuator arm positioning information to the primary actuator; and a secondary actuator controller linked to the feedback system and the secondary actuator and configured to receive the secondary error signal and in response to transmit a secondary control signal including secondary actuator arm positioning information to the secondary actuator.

2. The system of claim 1, wherein the feedback system is further adapted for creating a position error signal (PES) by using position information obtained from servo wedges in the storage disk modified combined with received runout information.

3. The system of claim 2, wherein the PES is used by the feedback system to produce the primary and secondary error signals.

4. The system of claim 2, wherein the feedback system is configured to utilize the PES to produce the secondary error signal and further configured to receive an actual position signal including angular position information for the primary actuator arm and to utilize the actual position signal to produce the primary error signal.

5. The system of claim 1, wherein the feedback system comprises a spatial position reconstruction mechanism for producing a reconstructed error signal comprising angular position information for the primary actuator arm utilizing an operating parameter of the primary actuator and wherein the primary error signal is produced by modifying the primary input signal using the reconstructed error signal.

6. The system of claim 5, wherein the operating parameter is the back electromotive force (EMF) of the primary actuator.

7. The system of claim 5, wherein the feedback system is further adapted for creating a position error signal (PES) by using position information obtained from servo wedges in the storage disk combined with received runout information and wherein the PES is used by the feedback system to produce the secondary error signal.

8. The system of claim 7, wherein the feedback system includes a settle detection element for determining when the primary error signal has a magnitude within a range and in response to the determining, transmitting an output signal to the secondary actuator controller.

9. The system of claim 8, wherein the secondary actuator controller includes a switch operable in response to the output signal to initiate the transmittal of the secondary control signal to the secondary actuator.

10. The system of claim 9, wherein the secondary actuator controller is operable prior to receiving the output signal to position the secondary actuator arm relative to the primary actuator arm such that a longitudinal axis of the secondary actuator arm is substantially centered in an operating range of the secondary actuator arm.

11. A method for controlling a position of a read and write head using a dual actuator assembly, the dual actuator assembly including a primary actuator operable to position a primary actuator arm and a secondary actuator attached to the primary actuator arm operable to position a secondary actuator arm upon which the head is attached, the method comprising:
receiving an input command signal including a desired track number;
first modifying the input command signal to create a primary actuator error signal;
processing the primary actuator error signal to control operation of the primary actuator to position the primary actuator arm;
independent of the first modifying, second separately modifying the input command signal to create a secondary actuator error signal; and
processing the secondary actuator signal to control operation of the secondary actuator to position the secondary actuator arm.

12. The method of claim 11, wherein the first modifying comprises processing a back electromotive force signal from the primary actuator to produce a reconstructed error signal including a determined spatial position of the primary actuator arm relative to a track corresponding to the desired track number and further comprises correcting the input command signal based on the reconstructed error signal.

13. The method of claim 11, further comprising detecting settling of the primary actuator including comparing the primary actuator error signal to a threshold and wherein the secondary actuator signal processing is initiated after the detecting settling determines the primary actuator signal is less than about the threshold.

14. The method of claim 13, wherein the second modifying comprises combining a position error signal (PES) with the input command signal.

15. The method of claim 14, further including prior to the second modifying creating the PES using position information obtained from servo wedges in a storage disk modified by sampled runout information.

16. A disk drive assembly, comprising:
an actuator assembly comprising a head for reading and writing data to a storage media, a primary actuator for positioning a primary actuator portion and a secondary actuator for positioning a secondary actuator portion, wherein the secondary actuator portion supports the head and the secondary actuator is mounted on the primary actuator portion;
a system processor for responding to a request corresponding to the storage media from a host by issuing an input command signal; and
a position control system for receiving the input command signal and modifying the input command signal to create a primary error signal and a secondary error signal, wherein the primary and secondary error signals are not the same, and wherein the position control system includes a primary actuator controller responsive to the primary actuator signal to control operation of the primary actuator and a secondary actuator controller responsive to the secondary actuator signal to control operation of the secondary actuator, whereby control of the positioning of the primary and secondary actuator portions is performed independently.

17. The disk drive assembly of claim 16, wherein the position control system includes a feedback system adapted for creating a position error signal (PES) for use in the modifying by using position information obtained from servo wedges in the storage disk combined with received runout information.

18. The disk drive assembly of claim 17, wherein the PES is used by the position control system to produce the primary and secondary error signals.

19. A disk drive assembly, comprising:
an actuator assembly comprising a head for reading and writing data to a storage media, a primary actuator for positioning a primary actuator portion and a secondary actuator for positioning a secondary actuator portion, wherein the secondary actuator portion supports the head and the secondary actuator is mounted on the primary actuator portion;
a system processor for responding to a request corresponding to the storage media from a host by issuing an input command signal; and
a position control system for receiving the input command signal and modifying the input command signal to create a primary error signal and a secondary error signal, wherein the position control system includes a primary actuator controller responsive to the primary actuator signal to control operation of the primary actuator and a secondary actuator controller responsive to the secondary actuator signal to control operation of the secondary actuator, whereby control of the positioning of the primary and secondary actuator portions is performed independently, the position control system includes a feedback system adapted for creating a position error signal (PES) for use in the modifying by using position information obtained from servo wedges in the storage disk combined with received runout information
wherein the feedback system comprises a spatial position reconstruction circuit for producing a reconstructed error signal comprising angular position information for the primary actuator portion utilizing an operating parameter of the primary actuator and wherein the primary error signal is produced by modifying the primary input signal using the reconstructed error signal.

20. The disk drive assembly of claim 19, wherein the operating parameter is the back electromotive force (EMF) of the primary actuator.

21. The disk drive assembly of claim 19, wherein the feedback system includes a settle detection element for determining when the primary error signal has a magnitude within a predetermined window of values and in response to the determining, transmitting an output signal to the secondary actuator controller.

22. The disk drive assembly of claim 21, wherein the secondary actuator controller includes a switch operable in response to the output signal to initiate the transmittal of the secondary control signal to the secondary actuator.

23. A position control system for use in a disk drive system for positioning a head relative to a storage disk in response to an input command signal, the disk drive system including a primary actuator for positioning a primary actuator arm and a secondary actuator linked to the primary actuator arm for positioning a secondary actuator arm on which the head is mounted, the position control system comprising:

a feedback system adapted for receiving the input command signal, for splitting the input command signal into a primary and a secondary input command signal and for modifying the primary and secondary input command signals to produce primary and secondary error signals.

24. A method for controlling a position of a read and write head using a dual actuator assembly, the method comprising:

first modifying an input command signal to create a primary actuator error signal;

processing the primary actuator error signal to control operation of a primary actuator to position a primary actuator arm;

independent of the first modifying, second separately modifying the input command signal to create a secondary actuator error signal; and processing a secondary actuator signal to control operation of a secondary actuator to position a secondary actuator arm.

25. A system for controlling a position of a read and write head using a dual actuator assembly, the dual actuator assembly including a primary actuator operable to position a primary actuator arm and a secondary actuator attached to the primary actuator arm operable to position a secondary actuator arm upon which the head is attached, the system comprising:

means for receiving an input command signal including a desired track number;

means for first modifying the input command signal to create a primary actuator error signal;

means for processing the primary actuator error signal to control operation of the primary actuator to position the primary actuator arm;

independent of the first modifying, second means for separately modifying the input command signal to create a secondary actuator error signal; and means for processing the secondary actuator signal to control operation of the secondary actuator to position the secondary actuator arm.

* * * * *